United States Patent
Julian et al.

(10) Patent No.: US 8,275,373 B2
(45) Date of Patent: Sep. 25, 2012

(54) RANDOMIZATION OF PERIODIC CHANNEL SCANS

(75) Inventors: David Jonathan Julian, San Diego, CA (US); Zhanfeng Jia, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1047 days.

(21) Appl. No.: 11/864,728

(22) Filed: Sep. 28, 2007

(65) Prior Publication Data

US 2009/0086702 A1     Apr. 2, 2009

(51) Int. Cl.
*H04W 4/00* (2009.01)
(52) U.S. Cl. ....... 455/434; 455/41.2; 455/41.3; 370/329
(58) Field of Classification Search .................. 455/434, 455/41.2, 41.3; 370/329
See application file for complete search history.

(56) References Cited

U.S. PATENT DOCUMENTS

| | | |
|---|---|---|
| 5,687,169 A | 11/1997 | Fullerton |
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |

(Continued)

OTHER PUBLICATIONS

Bluetooth SIG: "Bluetooth Specification Version 1.1 Inquiry Procedures" Bluetooth Specification Version 1.1, May 8, 2001, pp. 105-109, XP002208576 * p. 105, line 3-line 10  p. 105, line 14-line 16  p. 105, line 23-line 24 *~p. 106, line 35-line 36 * p. 107, line 7-line 8  p. 108, line 9-line 11 p. 108, line 15-line 24.

(Continued)

*Primary Examiner* — Justin Lee
(74) *Attorney, Agent, or Firm* — Dang M. Vo; Paul S. Holdaway

(57) ABSTRACT

An apparatus and method for wireless communications supports a periodic scan for wireless devices. The periodic scan includes a plurality of scans spaced apart in time. The phase of the periodic scan is changed in response to one of the wireless devices being detected in one of the scans.

31 Claims, 6 Drawing Sheets

U.S. PATENT DOCUMENTS

| | | |
|---|---|---|
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,114,010 B2 | 9/2006 | Karaoguz et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,215,923 B2 | 5/2007 | Hillyard |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,460,631 B2 | 12/2008 | Date et al. |
| 2002/0055978 A1* | 5/2002 | Joon-Bo et al. ............... 709/209 |
| 2002/0059434 A1 | 5/2002 | Karaoguz et al. |
| 2002/0114377 A1* | 8/2002 | Schmidl et al. ............... 375/132 |
| 2003/0027526 A1 | 2/2003 | Hillyard |
| 2004/0037323 A1* | 2/2004 | Kumar et al. .................. 370/480 |
| 2006/0045047 A1* | 3/2006 | Choi et al. ..................... 370/329 |
| 2006/0094402 A1* | 5/2006 | Kim .............................. 455/411 |
| 2006/0114841 A1 | 6/2006 | Date et al. |
| 2006/0172701 A1* | 8/2006 | Kienhoefer .................. 455/41.2 |
| 2011/0028817 A1* | 2/2011 | Jin et al. ....................... 600/365 |

OTHER PUBLICATIONS

International Search Report and Written Opinion—PCT/US2008/077909, International Search Authority—European Patent Office—May 26, 2009.
IEEE Std 802.1 5.1-2002, IEEE Standard for Information technology—Telecommunications and information exchange between systems—Local and metropolitan area networks—Specific requirements Part 15.1 : Wireless Medium Access Control (MAC) and Physical Layer (PHY) Specifications for Wireless Personal Area Networks (WPANs), Apr. 15, 2002.
European Search Report—EP08006543 Search Authority—Munich Patent Office May 15, 2009.

* cited by examiner

RANDOMIZATION OF PERIODIC CHANNEL SCANS

BACKGROUND

1. Field

The present disclosure relates generally to wireless communications, and more specifically to various techniques for randomization of periodic channel scans in wireless communication systems.

2. Background

Peer-to-peer networks are commonly used for connecting wireless devices via adhoc connections. These networks differ from the traditional client-server model where communications are usually with a central server. A peer-to-peer network has only equal peer devices that communicate directly with one another. Such networks are useful for many purposes. A peer-to-peer network may be used, for example, as a consumer electronic wire replacement system for short range or indoor applications. These networks are sometimes referred to as Wireless Personal Area Networks (WPAN) and are useful for efficiently transferring video, audio, voice, text, and other media between wireless devices in a cluster.

Various methods may be employed to establish a wireless connection between two wireless devices in a peer-to-peer network. Typically, each wireless device periodically transmits a discovery signal and then listens for a response. If a wireless device detects a response from another wireless device, the two then exchange signaling messages to set up a dedicated channel to support a wireless connection.

In order to conserve battery power, the wireless devices typically do not continuously scan for discovery signals from other wireless devices. Instead, the wireless device remains in a low power state, or sleep mode, most of the time and wakes up periodically to scan for a discovery signal. This procedure is sometimes referred to as periodic scanning. A problem may arise, however, if the periodic scanning of two wireless devices happens to be synchronous. In this case, both wireless devices may attempt to send a response to a discovery signal at the same time, thereby resulting in a collision.

Accordingly, there is a need in the art to improve the periodic scanning procedures of wireless devices in a peer-to-peer network to reduce repeated collisions. These improvements should be applicable to other networks as well.

SUMMARY

In one aspect of the disclosure, an apparatus for wireless communications includes a processing system configured to support a periodic scan for wireless devices, the periodic scan comprising a plurality of scans spaced apart in time, the processing system being further configured to change a phase of the periodic scan in response to one of the wireless devices being detected in one of the scans.

In another aspect of the disclosure, a method for wireless communications includes periodically scanning for wireless devices, the periodic scan comprising a plurality of scans spaced apart in time, and changing a phase of the periodic scan in response to one of the wireless devices being detected in one of the scans.

In a further aspect of the disclosure, an apparatus for wireless communications includes means for periodically scanning for wireless devices, the periodic scan comprising a plurality of scans spaced apart in time, and means for changing a phase of the periodic scan in response to one of the wireless devices being detected in one of the scans.

In yet a further aspect of the disclosure, a computer-program product for wireless communications includes computer-readable medium comprising codes executable by at least one processor to periodically scan for wireless devices, the periodic scan comprising a plurality of scans spaced apart in time, and change a phase of the periodic scan in response to one of the wireless devices being detected in one of the scans.

In another aspect of the disclosure, a headset includes a processing system configured to support a periodic scan for wireless devices, the periodic scan comprising a plurality of scans spaced apart in time, the processing system being further configured to change a phase of the periodic scan in response to one of the wireless devices being detected in one of the scans. The headset further includes a wireless interface configured to support a wireless connection with the detected wireless device, and a transducer configured to provide an audio output based on data received over the wireless connection.

In yet another aspect of the disclosure, a watch includes a processing system configured to support a periodic scan for wireless devices, the periodic scan comprising a plurality of scans spaced apart in time, the processing system being further configured to change a phase of the periodic scan in response to one of the wireless devices being detected in one of the scans. The watch further includes a wireless interface configured to support a wireless connection with the detected wireless device, and a user interface configured to provide an indication based on data received over the wireless link.

In a further aspect of the disclosure, a sensing device for wireless communications includes a processing system configured to support a periodic scan for wireless devices, the periodic scan comprising a plurality of scans spaced apart in time, the processing system being further configured to change a phase of the periodic scan in response to one of the wireless devices being detected in one of the scans. The sensor further includes a wireless interface configured to support a wireless connection with the detected wireless device, and a sensor configured to provide data to the wireless interface for transmission over the wireless link.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

Figure 1:
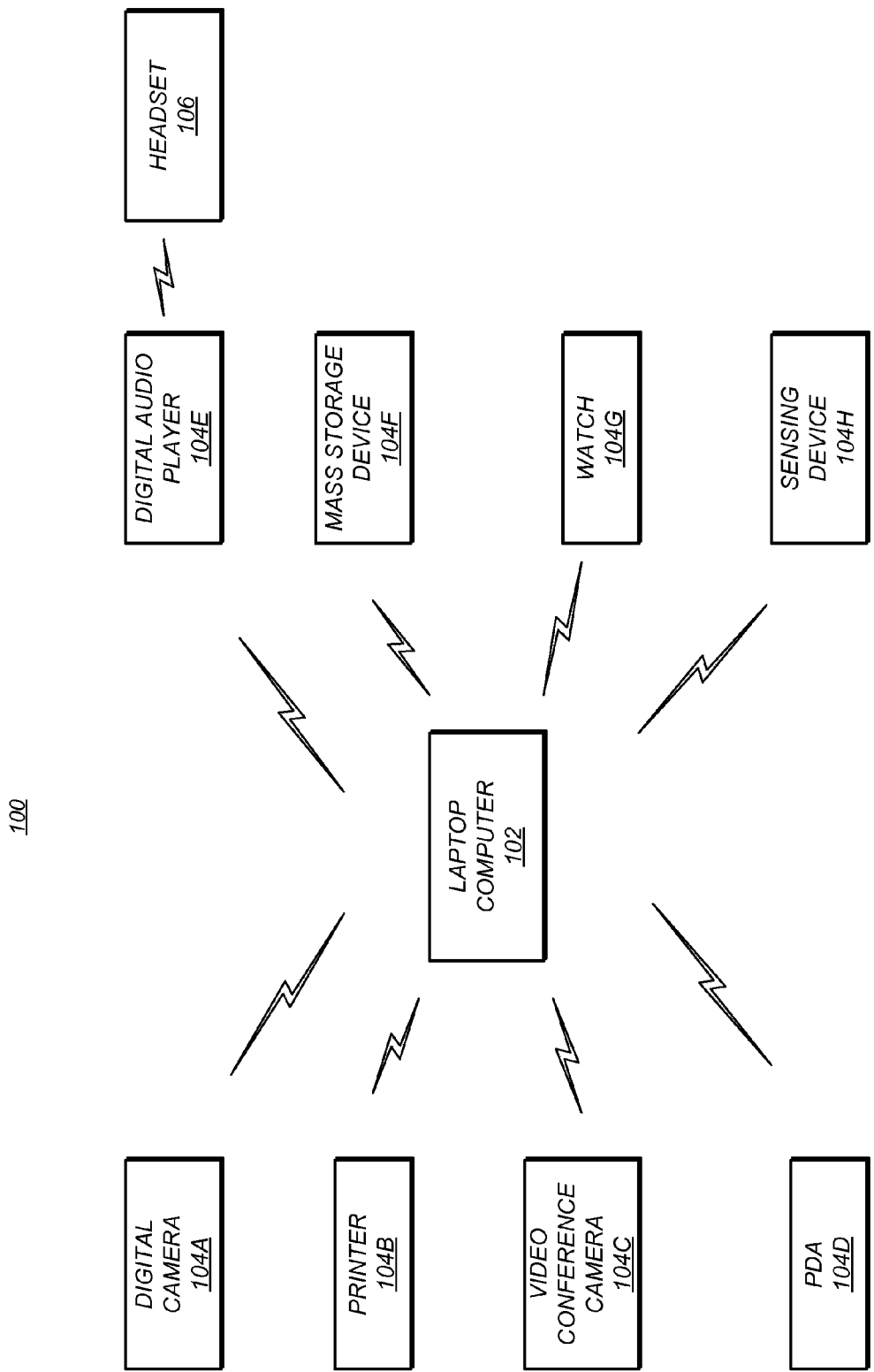
FIG. 1 is a conceptual diagram illustrating an example of a wireless communications system.

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Various aspects of one or more methods and apparatuses are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect comprises at least one element of a claim.

In the following detailed description, various aspects of methods and apparatuses will be described in the context of a Ultra-Wideband (UWB) system. UWB is a technology for providing high speed communications over an extremely wide bandwidth. Because UWB signals are transmitted in very short pulses that consume very little power, this technology is well suited for WPAN applications. However, as those skilled in the art will readily appreciate, the various aspects presented throughout this disclosure are likewise applicable to various other wireless communication systems. Accordingly, any reference to a UWB system is intended only to illustrate various aspects, with the understanding that such aspects have a wide range of applications. By way of example, various aspects disclosed throughout this disclosure may be applied to Bluetooth, 802.11, and other wireless protocols.

An example of a wireless communications system will now be presented. The wireless communications system may include a cluster of wireless devices in a home, office building, or other locality. As indicated earlier, the wireless communications system can generally be thought of as a consumer electronics wire replacement system, but is in no way limited to such applications. Each wireless device in the cluster may be capable of transmitting, receiving, or both. In the discussion that follows, the term receiving wireless device may be used to refer to a device that is receiving and the term transmitting wireless device may be used to refer to a device that is transmitting. Such a reference does not imply that the wireless device is incapable of performing both transmit and receive operations.

FIG. 1 is a conceptual diagram illustrating one example of a wireless communications system. The wireless communications system 100 is shown with a laptop computer 102 in communication with various other wireless devices 104. In this example, the computer 102 may receive digital photos from a digital camera 104A, send documents to a printer 104B for printing, communicate with a video conference camera 104C to support a live video feed, synch-up with e-mail on a Personal Digital Assistant (PDA) 104D, transfer music files to a digital audio player (e.g., MP3 player) 104E, back up data and files to a mass storage device 104F, set the time on a watch 104G, and receive data from a sensing device 104H (e.g., a medical device such as a biometric sensor, a heart rate monitor, a pedometer, an EKG device, etc.). Also shown is a headset 106 (e.g., headphones, earpiece, etc.) that receives audio from the digital audio player 104E.

In an alternative configuration of the wireless communications system 100 shown in FIG. 1, one or more wireless relay points may be used to extend the coverage of the system. By way of example, a relay point may be used to forward digital photos from the camera 104A to the computer 102 when the computer 102 is out of the transmission range of the camera 102A. In some configurations, multiple relay points may be used to establish a mesh network. In the mesh network, data from one of the wireless devices is routed from relay point to relay point until the data reaches its final destination at another wireless device. The relay points may be fixed or mobile. In the case of mobile relay points, the mesh network may be reconfigurable as the relay points move around the wireless communications system. The relay points, whether fixed or mobile, may be stand alone devices, or alternatively, integrated into another wireless device. By way of example, a relay point may be integrated into the PDA 104D shown in FIG. 1 and, depending upon its location, may provide wireless routing between the computer 102 and the camera 104A.

In one configuration of the wireless communications system 100, the computer 102 provides an access point to a Wide Area Network (WWAN) (i.e., a wireless network covering a regional, nationwide, or even a global region). One common example of a WAN is the Internet. In this example, the computer 102 shown in FIG. 1 may provide access to the Internet through an Internet Service Provider (ISP) via a telephone line, Integrated Services Digital Network (ISDN), Digital Subscriber Line (DSL), cable modem, fiber optic, or other suitable connection. Another example of a WAN is a cellular network that supports CDMA2000, a telecommunications standard that uses Code Division Multiple Access (CDMA) to send voice, data, and signaling between mobile subscribers. A cellular network is sometimes referred to as a Wireless Wide Area Network (WWAN). Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards.

In another configuration of the wireless communications system 100, the access point may be a telephone line, ISDN, DSL, cable, or fiber optic modem with a UWB connection to the computer 102. Alternatively, or in addition to, the computer 102 may have a UWB connection to an Ethernet modem, or some other interface to a Local Area Network (LAN) (i.e., a network generally covering tens to few hundred meters in homes, offices buildings, coffee shops, transportation hubs, hotels, etc.).

Figure 2:
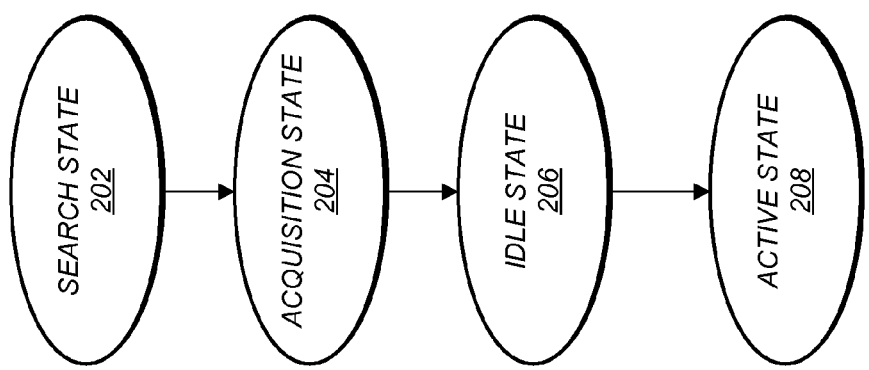
FIG. 2 is a state diagram illustrating the various states of a wireless device.

FIG. 2 is a state diagram illustrating the various states of a wireless device. When power is initially applied to the wireless device, it enters into a search state 202. During the search state 202, the wireless device searches for other wireless devices in the cluster by periodically transmitting a discover signal and then listening for a response. The discovery signal may be a packet containing a preamble comprising multiple repetitions of a pseudo-random number (PN) that is known, a priori, by all wireless devices in the cluster. If the wireless device receives a response from another wireless device to the discovery signal, it enters into an acquisition state 204.

A wireless device in the search state 202 may also scan for discovery signals transmitted by other wireless devices in the cluster. In order to conserve battery power, the wireless device does not continuously scan for discovery signals. Instead, the wireless device remains in a low power state, or sleep mode, most of the time and wakes up periodically to scan for a discovery signal. This procedure is sometimes referred to as periodic scanning. If the wireless device detects a discovery signal from another wireless device, it attempts to associate with that wireless device by transmitting a discovery response. The discovery response may be in the form of a packet containing the preamble followed by a control message. The control message may include the timing parameters for a common channel. The common channel is used by the wireless devices during the acquisition state to establish a radio connection by setting up various channels (e.g., paging channel, overhead channel, etc.). When the discovery response is received by the other wireless device, both devices enter into the acquisition state 204.

In one configuration of a cluster, a time hopping multiple access format is used to support UWB communications. Time hopping is a spread spectrum technique in which a wireless device transmits in a different time slot in each frame. More specifically, and by way of example only, a wireless device may transmit a bit of information in every frame. In this example, the frame is divided into sixteen time slots. The wireless device transmits a pulse in one of the first eight time slots if the bit is a "zero" and transmits a pulse in one of the second eight time slots if the bit is a "one." The particular time slot in which the wireless device transmits the pulse in each frame is changed or randomized by a pseudo-random permutation sequence.

During the acquisition state 204, the wireless device transmitting the discovery response includes in the control message its address. The address and the channel ID for the common channel form a seed for the pseudo-random permutation sequence for the common channel. The control message enables the wireless device receiving the discovery response to enter into the acquisition mode 204 and communicate with the wireless device that transmitted the discovery response on the common channel. These communications involve an exchange of signaling packets to establish the radio connection by setting up various channels. The signaling packets include the preamble followed by signaling messages containing the seed and/or other timing parameters for the channels.

Once the exchange of signaling packets is complete, the wireless devices enter into the idle state 206. In the idle state 206, the wireless device monitors the paging channel for an incoming call. In order to conserve battery power, slotted paging may be used. In a slotted paging configuration, both wireless devices agree during the acquisition mode in which slots the devices will be paged. The wireless device can power down some of its processing circuitry during unassigned slots and enter into a sleep mode. During the assigned slots, the wireless device wakes up and monitors the paging channel.

When the wireless device receives a page, or originates a call, it enters into an active state 208. In the active state, the wireless device negotiates the parameters of the call with the other wireless device through an exchange of signaling packets. The signaling packets include the preamble followed by signaling messages containing the seed and/or other timing parameters for a dedicated channel to support the call. Once the call is negotiated, the wireless devices may engage in the call on the dedicated channel.

Figure 3A:
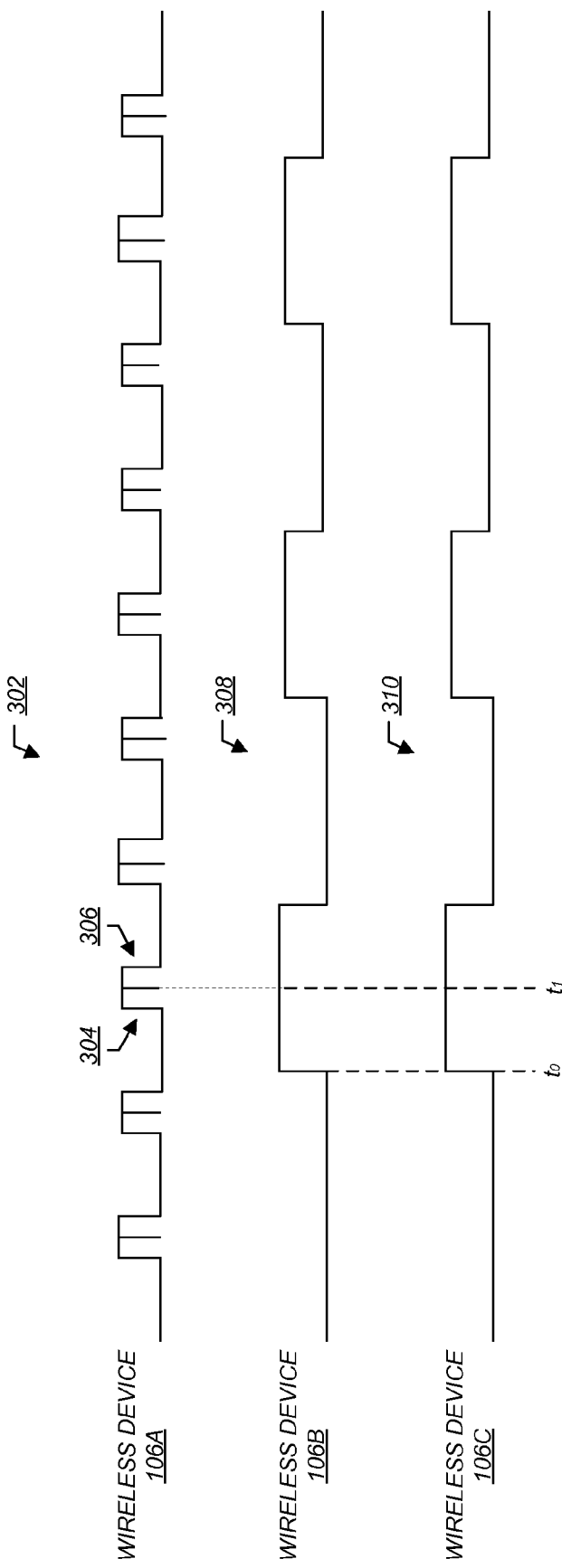
FIGS. 3A-3C are timing diagrams illustrating examples of periodic scanning procedures for wireless devices in a cluster during the search mode.

FIG. 3A is a timing diagram illustrating an example of a periodic scanning procedure for wireless devices in a cluster during the search mode. In this example, a first wireless device 106A periodically transmits a discovery signal and then listens for a response as shown by waveform 302. The transmission of the discovery signal is represented by the portion of the waveform 302 that is designated by 304 and the time in which the first wireless device 106A listens for a response is represented by the portion of the waveform 302 that is designated 306. A second wireless device 106B, which is in a sleep most of the time, wakes up periodically to scan for a discovery signal as shown by waveform 308. A third wireless device 106C has a periodic scan that is generally in synchronization with the periodic scan of the second wireless device 106B as shown by waveform 310.

In this timing sequence, both the second and the third wireless devices 106B, 106C wake up at $t_0$ and detect the discovery signal transmitted by the first wireless device 106A. In response to the discovery signal, both the second and third wireless devices 106B, 106C send a discovery response. As a result, the first wireless device 106A may not be able to detect either the second or third wireless device 106B, 106C when it begins listening for a discovery response at $t_1$. At best, the first wireless device 106A is able to detect only one of the two wireless devices 106B, 106C. This condition is sometimes referred to as a collision.

The frequency of collisions may be reduced by randomizing the period scan of the wireless devices. Specifically, the phase of the periodic scan is changed in a random or pseudo-random fashion after a scan. In one configuration of the wireless device, the phase is changed following a scan in which a discovery signal is detected. The phase may be changed independent of whether the wireless device was able to associate with the wireless device transmitting the discovery signal. In this configuration, the change doesn't affect the interval (T) between scans, thus the duty cycle remains unchanged.

The phase of the periodic scan may be changed or randomized by modifying a schedule routine maintained by the wireless device. The manner in which the phase may be changed or randomized may vary depending upon the specific application, the performance requirements, the overall design constraints, and/or other relevant factors. By way of example, the scheduling routine may be modified by scheduling the next scan at time $\alpha T$, where $\alpha$ is a pseudo-random number uniformly distributed between 0.5 and 1.5 across any number of scans. An example will now be presented with reference to FIG. 3B.

In this example, the first wireless device 106A is able to detect the discovery response transmitted by the second wireless device 106B at $t_1$. The discovery response transmitted by the third wireless device 106C, however, is not successfully detected by the first wireless device 106A. As a result, the second wireless device 106B will attempt to associate with the first wireless device 106A, while the third wireless device 106C goes back to sleep.

The phase of the periodic scan for both the second and third wireless devices 106B, 106C is changed. In the example shown in FIG. 3B, the phase of the periodic scan for the second wireless device 106B is changed by $\alpha_2 T$ and the phase of the periodic scan for the third wireless device 106C is changed by $\alpha_3 T$. The interval of the periodic scan for both wireless devices 106B, 106C remains at T.

Following the phase change, the second wireless device 106B wakes up at $t_2$, detects a discovery signal from the first wireless device at $t_3$, and transmits a discovery response. The third wireless device 106C wakes up at $t_4$, detects a discovery signal from the first wireless device at $t_5$, and transmits a discovery response. As a result, a collision is avoided and both the second and third wireless devices 106B, 106C can associate with the first wireless device 106A.

Figure 3B:
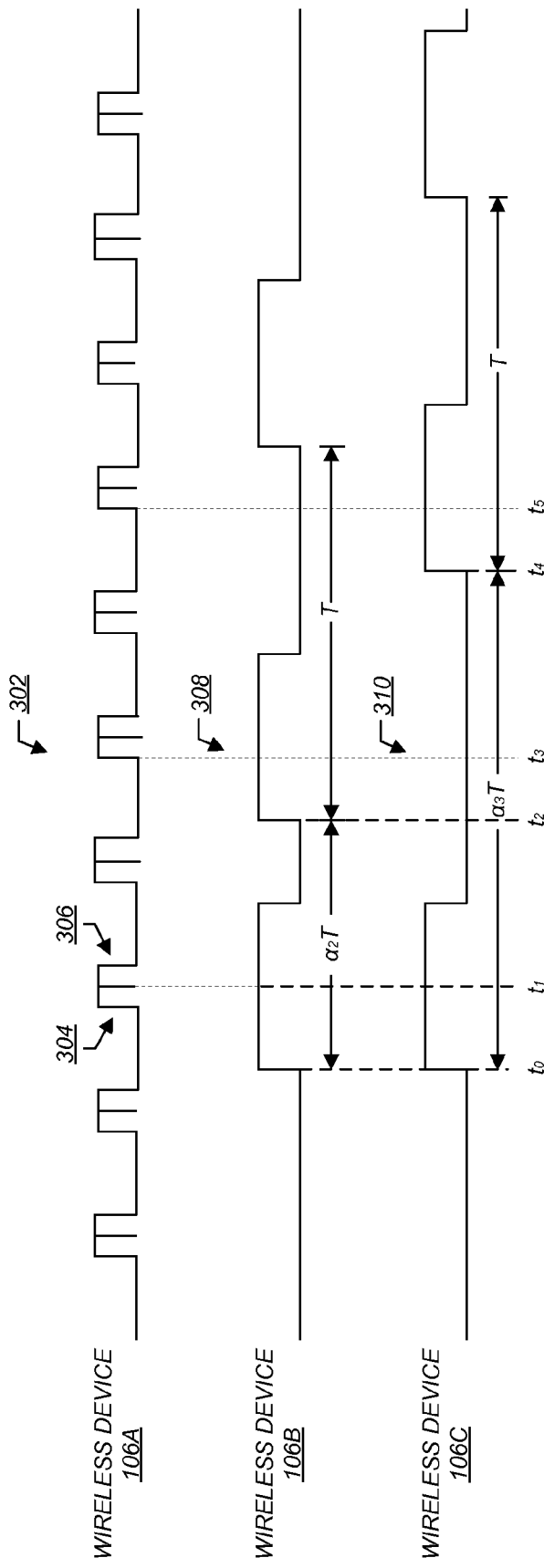
Figure 3C:
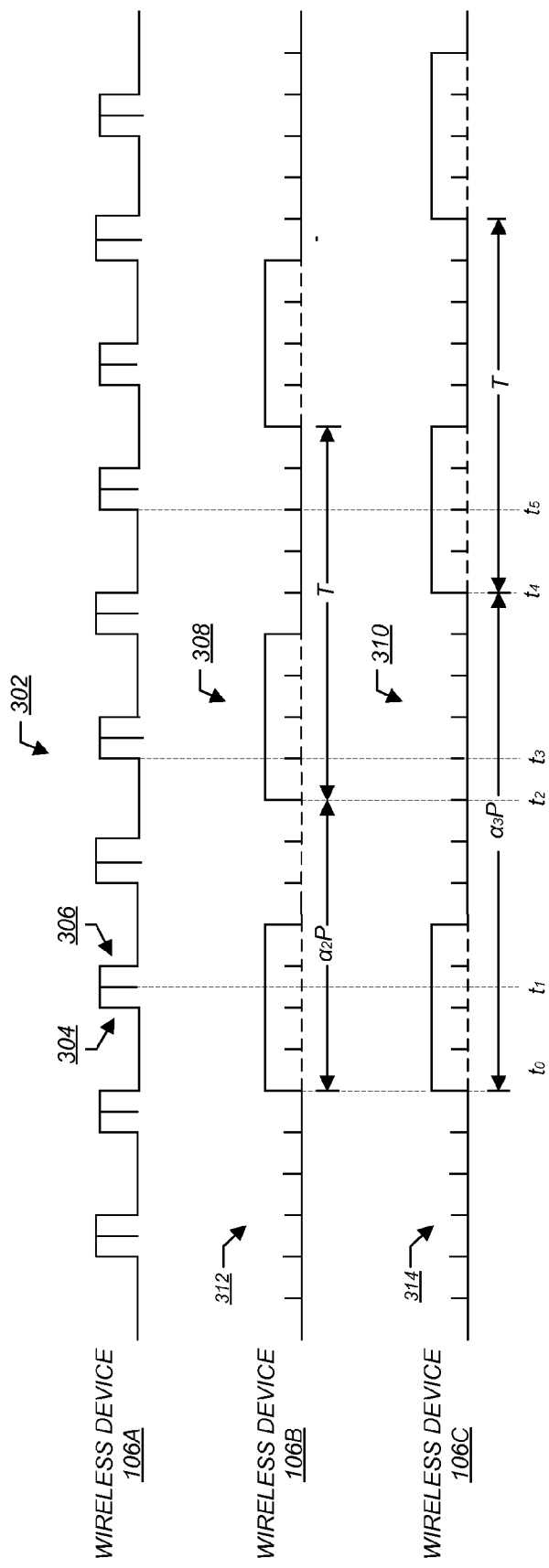

Another example will be presented with reference to FIG. 3C. In FIG. 3C, paging scans for the second and third wireless devices 106B, 106C are shown. The paging scan for the second wireless device 106B is represented by the portion of the waveform 308 that is designated by 312. The paging scan for the third wireless device 106C is represented by the portion of the waveform 310 that is designated by 314. In this example, the periodic scanning interval T for each of the wireless devices 106B, 106C is a multiple of its paging scan interval P (i.e., T=kP, where k is a constant), although this is not required in all configurations.

Similar to the example previously presented in connection with FIG. 3B, the first wireless device 106A is able to detect the discovery response transmitted by the second wireless device 106B, but unable to detect the discovery response transmitted by the third wireless device 106C. As a result, the second wireless device 106B will attempt to associate with the first wireless device 106A, while the third wireless device 106C goes back to sleep.

The phase of the periodic scan for each of the wireless devices 106B, 106C is then changed. In this example, the scheduling routine for each wireless device 106B, 106C may be modified by scheduling the next scan at time αP, where $α_2=7$ and $α_3=12$. The interval of the periodic scan for both wireless devices 106B, 106C remains at T, where k =9.

Following the phase change, the second wireless device 106B wakes up at $t_2$, detects a discovery signal from the first wireless device at $t_3$, and transmits a discovery response. The third wireless device 106C wakes up at $t_4$, detects a discovery signal from the first wireless device at $t_5$, and transmits a discovery response. As a result, a collision is avoided and both the second and third wireless devices 106B, 106C can associate with the first wireless device 106A.

In an alternative configuration of a cluster, the periodic scanning interval T for each of the wireless devices 106B, 106C may not be a multiple of its paging scan interval. In these configurations, the scheduling routine for each of the wireless nodes 106B, 106C may be modified by scheduling the next scan of the periodic scan with the last paging scan before time T following the scan in which the first wireless node 106A is detected.

Figure 4:
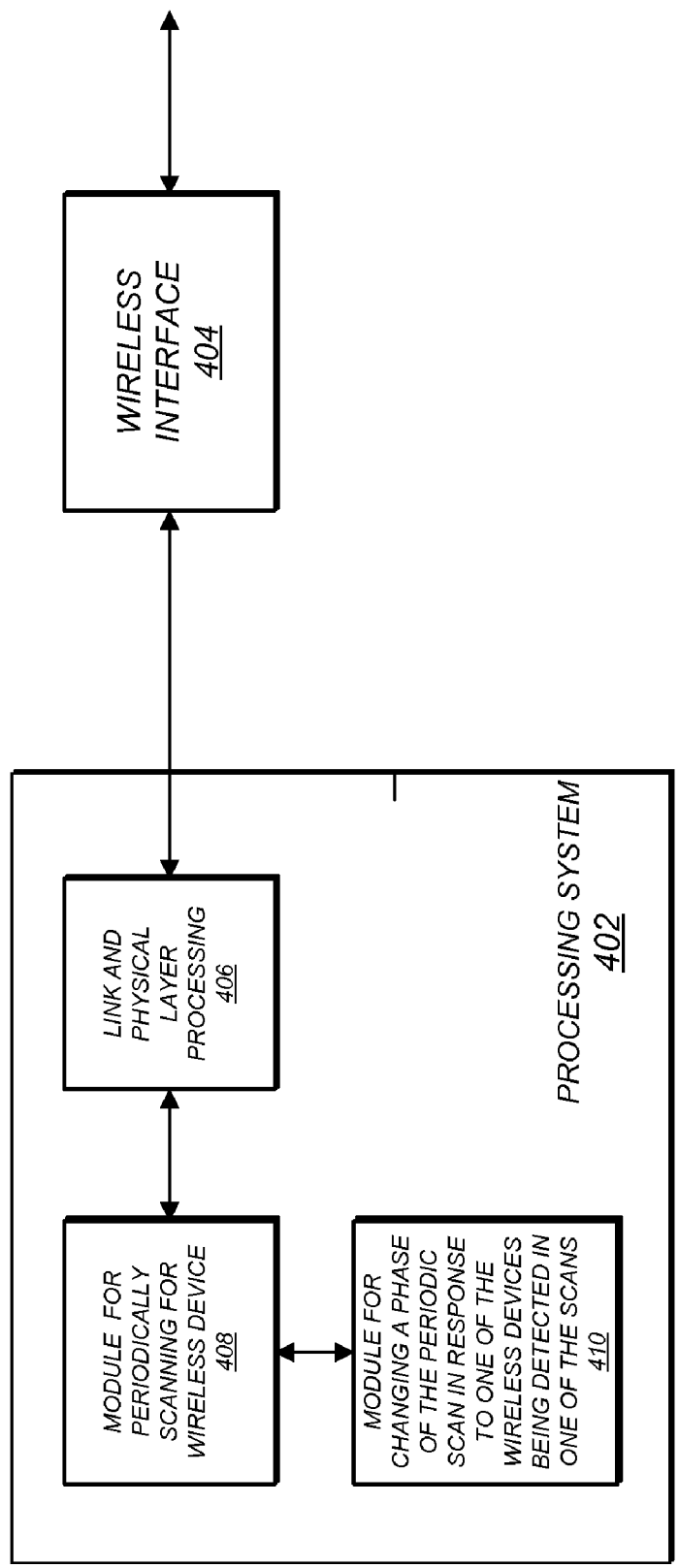
FIG. 4 is a block diagram illustrating an example of the functionality of a wireless device.

FIG. 4 is a block diagram illustrating an example of the functionality of an wireless device terminal 106. The wireless device 106 is shown with a processing system 402 and a wireless interface 404. The wireless device 404 may be a transmitter, receiver, transceiver, or other suitable component capable of supporting a wireless connection. The wireless transceiver 404 may be used to implement the analog portion of the physical layer and the processing system 402 may include a module 406 for implementing the digital processing portion of the physical layer, as well as the link layer. The processing system 402 may also be used to perform various other functions, including the process of associating with other wireless devices in the cluster. Specifically, the processing system 402 may include a module 408 for periodically scanning for wireless devices. The processing system 402 may also include a module 410 for changing a phase of the periodic scan in response to one of the wireless devices being detected in one of the scans.

The processing systems 402 may be implemented using software, hardware, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
a processing system configured to support a periodic scan for wireless devices, the periodic scan comprising a plurality of scans spaced apart in time, the processing system being further configured to change a phase of the periodic scan in response to one of the wireless devices being detected in one of the scans, wherein the change in the phase of the periodic scan is based on a fixed time period of the periodic scan and a pseudorandom number;
wherein the processing system is further configured to change the phase of the periodic scan while maintaining the fixed time period between the scans; and wherein the processing system is further configured to scheduled each of the scans, and wherein the processing system is further configured to change the phase of the periodic scan by scheduling a next scan at a time following said one of the scans, the time being equal to the fixed time period multiplied by the pseudo-random number.

2. The apparatus of claim 1 wherein the processing system is further configured to attempt to associate with the detected wireless device, and wherein the processing system is further configured to change the phase of the periodic scan independent of whether the processing system is able to associate with the detected wireless device.

3. The apparatus of claim 1 wherein the processing system is further configured to support a plurality of paging scans spaced apart in time, the processing system being further configured to change the phase of the periodic scan by shifting the periodic scan such that a first boundary of said one of the scans is aligned with a second boundary of one of the paging scans.

4. The apparatus of claim 3 wherein said one of the paging scans is a last paging scan in time preceding said one of the scans.

5. The apparatus of claim 1 wherein the processing system is further configured to support a plurality of paging scans spaced apart in time, the paging scans each having a fixed duration, and wherein the fixed time period of the periodic scan is a multiple of the fixed duration, the processing system being further configured to change the phase of the periodic scan by shifting the periodic scan such that a first boundary of said one of the scans is aligned with a second boundary of one of the paging scans.

6. The apparatus of claim 1 wherein the processing system is further configured to support a plurality of paging scans spaced apart in time, the paging scans each having a fixed duration.

7. The apparatus of claim 1 wherein the processing system is further configured to attempt to associate with the detected wireless device by sending parameters to support a time-hopping channel with the detected wireless device.

8. The apparatus of claim 1 wherein the processing system is further configured to transmit a discovery signal between two of the scans for detection by any of the wireless devices.

9. The apparatus of claim 1, wherein the change in the phase of the periodic scan is greater than the period of the periodic scan.

10. A method for wireless communications, comprising:
periodically scanning for wireless devices, the periodic scan comprising a plurality of scans spaced apart in time; and
changing a phase of the periodic scan in response to one of the wireless devices being detected in one of the scans, wherein the change in the phase of the periodic scan is based on a fixed time period of the periodic scan and a pseudorandom number, wherein the phase of the periodic scan is changed while maintaining the fixed time period between the scans; and
scheduling each of the scans, and wherein the phase of the periodic scan is changed by scheduling a next scan following said one of the scans based on the pseudo-random number, wherein the phase of the periodic scan is changed by scheduling the next scan at a time following said one of the scans, the time being equal to the fixed time period multiplied by the pseudo-random number.

11. The method of claim 10 further comprising attempting to associate with the detected wireless device, and wherein the phase of the periodic scan is changed independent of whether the attempt to associate with the detected wireless device is successful.

12. The method of claim 10 further comprising support a plurality of paging scans spaced apart in time, and wherein the phase of the periodic scan is changed by shifting the periodic scan such that a first boundary of said one of the scans is aligned with a second boundary of one of the paging scans.

13. The method of claim 12 wherein said one of the paging scans is a last paging scan in time preceding said one of the scans.

14. The method of claim 10 further comprising supporting a plurality of paging scans spaced apart in time, the paging scans each having a fixed duration, the fixed time period of the periodic scan being a multiple of the fixed duration, and wherein the periodic scan is changed by shifting the periodic scan such that a first boundary of said one of the scans is aligned with a second boundary of one of the paging scans.

15. The method of claim 10 further comprising supporting a plurality of paging scans spaced apart in time, the paging scans each having a fixed duration.

16. The method of claim 10 further comprising attempting to associate with the detected wireless device by sending parameters to support a time-hopping channel with the detected wireless device.

17. The method of claim 10 further comprising transmitting a discovery signal between two of the scans for detection by any of the wireless devices.

18. The method of claim 10, wherein the change in the phase of the periodic scan is greater than the period of the periodic scan.

19. An apparatus for wireless communications, comprising:
means for periodically scanning for wireless devices, the periodic scan comprising a plurality of scans spaced apart in time; and
means for changing a phase of the periodic scan in response to one of the wireless devices being detected in one of the scans, wherein the change in the phase of the periodic scan is based on a fixed time period of the periodic scan and a pseudorandom number, wherein the means for changing a phase of the periodic scan is configured to change the phase while maintaining the fixed time period between the scans;
wherein the means for changing a phase of the periodic scan comprises means for each of the scans, and wherein the means for changing a phase of the periodic scan is configured to change the phase by scheduling a next scan following said one of the scans based on the pseudo-random number;
wherein the means for changing a phase of the periodic scan is configured to change the phase by scheduling the next scan at a time following said one of the scans, the time being equal to the fixed time period multiplied by the pseudo-random number.

20. The apparatus of claim 19 further comprising means for attempting to associate with the detected wireless device, and wherein the means for changing a phase of the periodic scan is configured to change the phase independent of whether the attempt to associate with the detected wireless device is successful.

21. The apparatus of claim 19 further comprising means for support a plurality of paging scans spaced apart in time, and wherein the means for changing a phase of the periodic scan is configured to change the phase by shifting the periodic scan such that a first boundary of said one of the scans is aligned with a second boundary of one of the paging scans.

22. The apparatus of claim 21 wherein said one of the paging scans is the last paging scan in time preceding said one of the scans.

23. The apparatus of claim 19 further comprising means for supporting a plurality of paging scans spaced apart in time, the paging scans each having a fixed duration, the fixed time period of the periodic scan being a multiple of the fixed duration, and wherein the means for changing a phase of the periodic scan is configured to change the phase by shifting the periodic scan such that a first boundary of said one of the scans is aligned with a second boundary of one of the paging scans.

24. The apparatus of claim 19 further comprising means for supporting a plurality of paging scans spaced apart in time, the paging scans each having a fixed duration.

25. The apparatus of claim 19 further comprising means for attempting to associate with the detected wireless device by sending parameters to support a time-hopping channel with the detected wireless device.

26. The apparatus of claim 19 further comprising means for transmitting a discovery signal between two of the scans for detection by any of the wireless devices.

27. The apparatus of claim 19, wherein the change in the phase of the periodic scan is greater than the period of the periodic scan.

28. A computer-program product for wireless communications, comprising:
a non-transitory computer-readable storage medium comprising codes executable by at least one processor to:
periodically scan for wireless devices, the periodic scan comprising a plurality of scans spaced apart in time;
change a phase of the periodic scan in response to one of the wireless devices being detected in one of the scans, wherein the change in the phase of the periodic scan is based on a fixed time period of the periodic scan and a pseudorandom number, wherein the phase of the periodic scan is changed while maintaining the fixed time period between the scans; and
schedule each of the scans, and wherein the phase of the periodic scan is changed by scheduling a next scan following said one of the scans based on the pseudo-random number, wherein the phase of the periodic scan is changed by scheduling the next scan at a time following said one of the scans, the time being equal to the fixed time period multiplied by the pseudo-random number.

29. A headset, comprising:
a processing system configured to support a periodic scan for wireless devices, the periodic scan comprising a plurality of scans spaced apart in time, the processing system being further configured to change a phase of the periodic scan in response to one of the wireless devices being detected in one of the scans, wherein the change in the phase of the periodic scan is based on a fixed time period of the periodic scan and a pseudorandom number wherein the processing system is further configured to change the phase of the periodic scan while maintaining the fixed time period between the scans and wherein the processing system is further configured to schedule each of the scans, and wherein the processing system is further configured to change the phase of the periodic scan by scheduling a next scan at a time following said one of the scans, the time being equal to the fixed time period multiplied by the pseudo-random number;
a wireless interface configured to support a wireless connection with the detected wireless device; and
a transducer configured to provide an audio output based on data received over the wireless connection.

30. A watch comprising:
a processing system configured to support a periodic scan for wireless devices, the periodic scan comprising a plurality of scans spaced apart in time, the processing system being further configured to change a phase of the periodic scan in response to one of the wireless devices being detected in one of the scans, wherein the change in the phase of the periodic scan is based on a fixed time period of the periodic scan and a pseudorandom number wherein the processing system is further configured to change the phase of the periodic scan while maintaining the fixed time period between the scans and wherein the processing system is further configured to schedule each of the scans, and wherein the processing system is further configured to change the phase of the periodic scan by scheduling a next scan at a time following said one of the scans, the time being equal to the fixed time period multiplied by the pseudo-random number;
a wireless interface configured to support a wireless connection with the detected wireless device; and
a user interface configured to provide an indication based on data received over the wireless link.

31. A sensing device for wireless communications, comprising:
a processing system configured to support a periodic scan for wireless devices, the periodic scan comprising a plurality of scans spaced apart in time, the processing system being further configured to change a phase of the periodic scan in response to one of the wireless devices being detected in one of the scans, wherein the change in the phase of the periodic scan is based on a fixed time period of the periodic scan and a pseudorandom number wherein the processing system is further configured to change the phase of the periodic scan while maintaining the fixed time period between the scans and wherein the processing system is further configured to schedule each of the scans, and wherein the processing system is further configured to change the phase of the periodic scan by scheduling a next scan at a time following said one of the scans, the time being equal to the fixed time period multiplied by the pseudo-random number;
a wireless interface configured to support a wireless connection with the detected wireless device; and
a sensor configured to provide data to the wireless interface for transmission over the wireless link.

* * * * *